United States Patent [19]

Jessup, Jr. et al.

[11] Patent Number: 5,581,706
[45] Date of Patent: Dec. 3, 1996

[54] METHOD FORMING AN AUDIO/VIDEO INTERACTIVE DATA SIGNAL

[75] Inventors: Ansley W. Jessup, Jr., Willingboro; Kuriacose Joseph, Plainsboro, both of N.J.

[73] Assignee: RCA Thomson Licensing Corporation, Princeton, N.J.

[21] Appl. No.: 269,291

[22] Filed: Jun. 30, 1994

[51] Int. Cl.⁶ .......................................... G06F 9/00
[52] U.S. Cl. .................. 395/200.13; 395/200.09; 395/200.15; 395/615; 395/849
[58] Field of Search ........................... 395/823, 824, 395/849, 850, 860, 878, 200.09, 200.13, 200.17, 200.18, 824, 826, 841, 849, 850, 853, 600; 348/7, 8, 9, 10, 13, 14, 15; 360/33.1, 39; 370/60, 77

[56] References Cited

U.S. PATENT DOCUMENTS

| | | | |
|---|---|---|---|
| 4,862,268 | 8/1989 | Campbell et al. | 348/463 |
| 4,920,432 | 4/1990 | Eggers et al. | 360/33.1 |
| 5,119,188 | 6/1992 | McCalley et al. | 348/6 |
| 5,195,092 | 3/1993 | Wilson et al. | 370/94.2 |
| 5,343,238 | 8/1994 | Lappington et al. | 348/12 |
| 5,347,632 | 9/1994 | Filepp et al. | 395/200.09 |
| 5,381,547 | 1/1995 | Flug et al. | 395/700 |
| 5,414,455 | 5/1995 | Hooper et al. | 348/7 |
| 5,440,336 | 8/1995 | Buhro et al. | 348/13 |
| 5,442,390 | 8/1995 | Hooper et al. | 348/7 |
| 5,448,568 | 9/1995 | Delpuch et al. | 370/94.2 |
| 5,453,779 | 9/1995 | Dan et al | 348/7 |
| 5,463,620 | 10/1995 | Sriram | 370/60 |
| 5,487,167 | 1/1996 | Dinallo et al. | 395/650 |
| 5,526,035 | 6/1996 | Lappington et al. | 348/13 |

FOREIGN PATENT DOCUMENTS

| | | | |
|---|---|---|---|
| WO88/01463 | 2/1988 | WIPO | H04N 7/04 |
| WO91/03112 | 3/1991 | WIPO | H04H 1/00 |
| WO92/12599 | 7/1992 | WIPO | H04N 7/173 |
| WO94/14284 | 6/1994 | WIPO | H04N 7/16 |

OTHER PUBLICATIONS

K. Joseph et al., Prioritization and Transport in the ADTV Digital Simulcast System, *IEEE Transactions on Consumer Electronics*, vol. 38, No. 3, Aug. 1992, pp. 319–324.

*Primary Examiner*—Alpesh M. Shah
*Assistant Examiner*—Dhiren R. Odedra
*Attorney, Agent, or Firm*—Joseph S. Tripoli; Eric P. Herrmann; Ronald H. Kurdyla

[57] ABSTRACT

A method and apparatus for generating an interactive component data stream, representing an application program, for an audio video interactive (AVI) composite signal, is disclosed. The method comprises the following steps. First, program files representing the application program are generated. Then, flow data defining the data structure of the interactive component is generated. Finally the data stream is generated by selectively inserting program files into the data stream in response to the flow data. Apparatus for generating such an interactive component data stream comprises a source of program files representing the application program and a source of flow data defining the data structure of the interactive component. A flow builder selectively inserts files from the source of files into the interactive component in response to data from the flow data source.

20 Claims, 6 Drawing Sheets

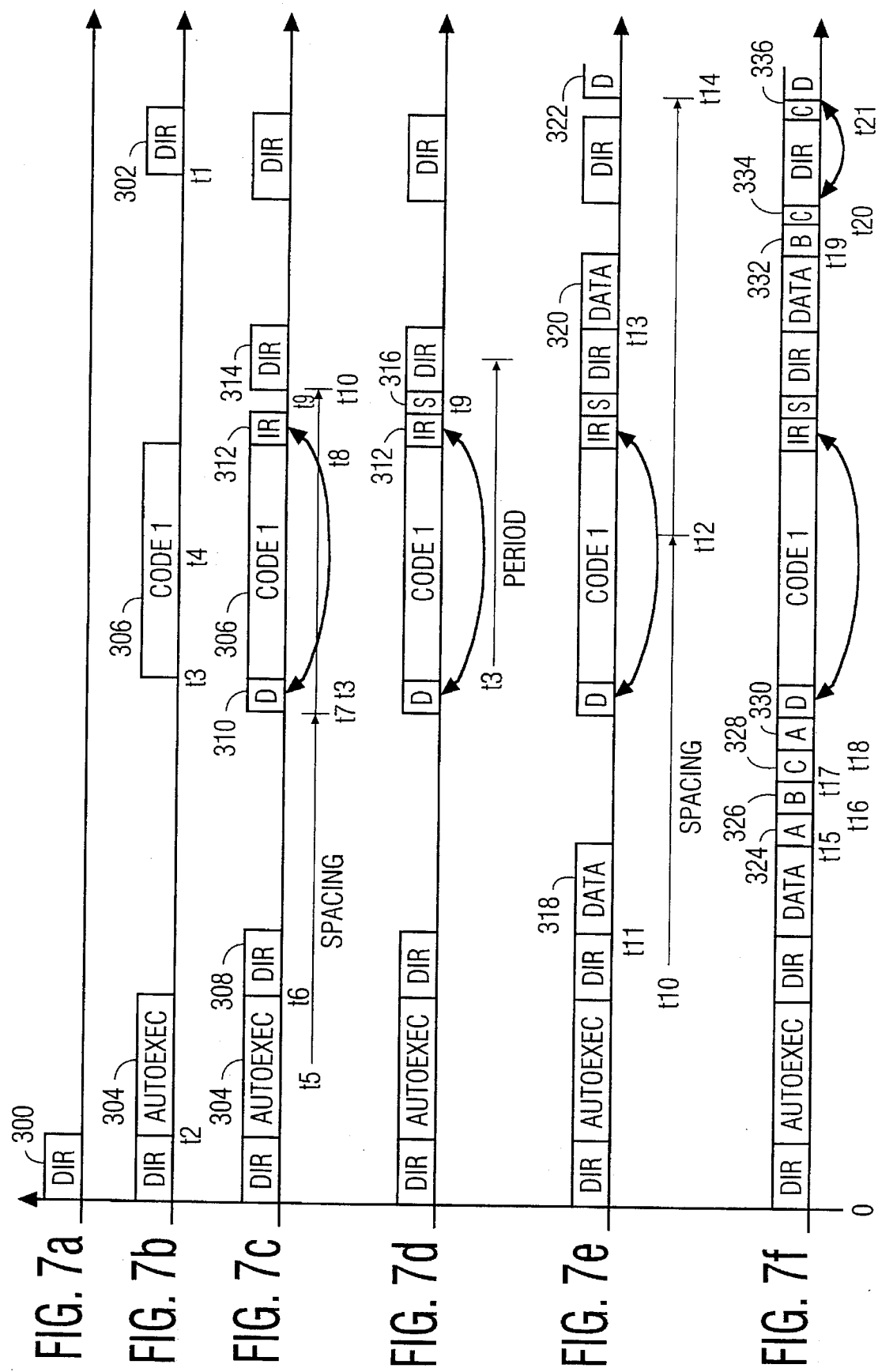

METHOD FORMING AN AUDIO/VIDEO INTERACTIVE DATA SIGNAL

The present invention relates to a flow builder for an audio video interactive (AVI) transmission system.

An audio video interactive (AVI) system is a proposed broadcast entertainment system in which a composite signal is broadcast from a broadcast location to receiving locations. An AVI signal includes audio and video components, as in present television systems, and also an interactive application component. The receiver location includes a data processor for extracting the interactive application component; providing screen displays and sounds overlaid on the broadcast video and audio, respectively; and responding to viewer inputs; all in response to the interactive application component. The data processor in the receiving location may also include a communication device, such as a modem, for communicating information from the viewer back to the broadcaster or to another party, such as an advertiser, again in response to the interactive application component.

The interactive application component comprises a plurality of modules, including a directory module, which acts as a table of contents for other modules making up the interactive program component. In addition, there is at least one code module, containing executable code which is executed by the data processor in the receiving location. In particular, one code module, designated the auto-exec module, contains the executable code necessary to start execution of the interactive application. This auto-exec module is automatically extracted from the interactive application component and executed when the data processor at the receiving location first detects the presence of the interactive application component. There may also be one or more data modules containing data which is to be processed by the data processor in the receiving location according to the executable code in the code module or modules. Finally, the AVI composite signal may also include signal modules, for sending messages to the interactive application.

In order to permit viewers to join an AVI application at any time, to proceed with the interaction at their own pace, and to minimize the amount of memory required in the data processors in the receiving locations, it is envisioned that code and data modules will be continuously repeated in the AVI signal. It may be necessary for some modules to be repeated more often than other modules. For example, in order to minimize the time between when the AVI composite signal is first tuned by the viewer, and when the viewer may begin interaction, it may be desirable to repeat both the directory module and auto-exec module more often than other modules in the interactive component. In addition, it may be necessary to ensure that a particular module is transmitted to the receiving locations by some predetermined time. For example, in the case of subtitling, it is necessary that the data module containing the subtitles arrive at the receiver before the audio component speaking those words.

The application programmer knows, when the application is being programmed, which modules should be repeated more often than others and/or which modules must be transmitted by a predetermined time. The application programmer, thus, can provide data specifying which modules are to be included in the interactive application component, and provide scheduling data for those modules, as a part of application preparation. It is desirable to provide a mechanism for analyzing the module and scheduling data, thus provided, and generating the interactive component data stream satisfying any required scheduling constraints, and maximizing compliance with any other scheduling constraints.

In accordance with principles of the present invention, a method for generating an interactive component data stream, representing an application program, for an audio video interactive (AVI) composite signal, comprises the following steps. First, program files representing the application program are generated. Then, flow data defining the data structure of the interactive component is generated. Finally, the data stream is generated by selectively inserting program files into the data stream in response to the flow data. Apparatus for generating such an interactive component data stream comprises a source of program files representing the application program and a source of flow data defining the data structure of the interactive component. A flow builder selectively inserts files from the source of files into the interactive component in response to data from the flow data source.

In the drawing:

FIG. 1 is a block diagram of a portion of a transmitting location including a flow builder according to the present invention;

FIG. 2 s a block diagram of a data processing system including a flow builder in accordance with the present invention;

FIG. 7 is a timing diagram useful in understanding the scheduling process illustrated in FIG. 6;

Figure 1:
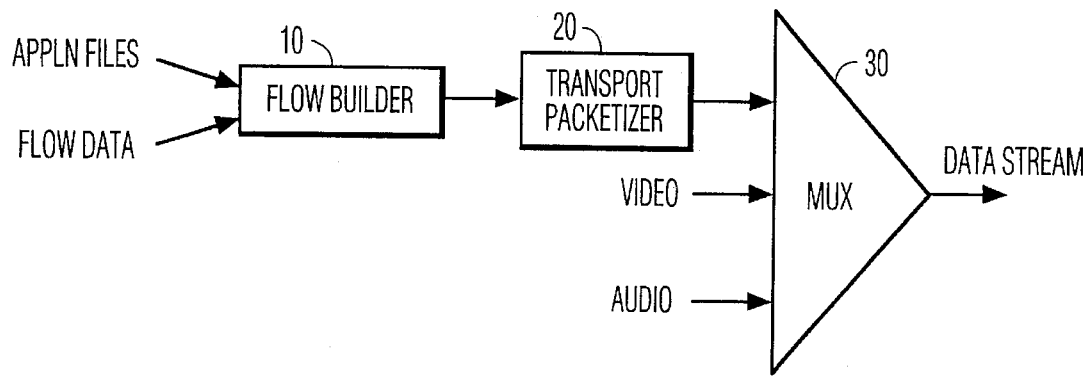

FIG. 1 is a block diagram of a portion of a transmitting location including a flow builder according to the present invention. In FIG. 1, application files, such as code and data files, and flow data, specifying modules to be included in the application component data stream and scheduling information for those modules, are both supplied by an application programmer to respective input terminals of a flow builder 10. An output terminal of the flow builder 10 is coupled to an input terminal of a transport packetizer 20. An output terminal of the transport packetizer 20 is coupled to a first input terminal of a multiplexer 30. An output terminal of the multiplexer 30 is coupled to the transport medium carrying the AVI data stream. A second input terminal of the multiplexer 30 is coupled to receive a packetized video representative data signal, and a third input terminal of the multiplexer 30 is coupled to receive a packetized audio representative data signal.

Figure 2:
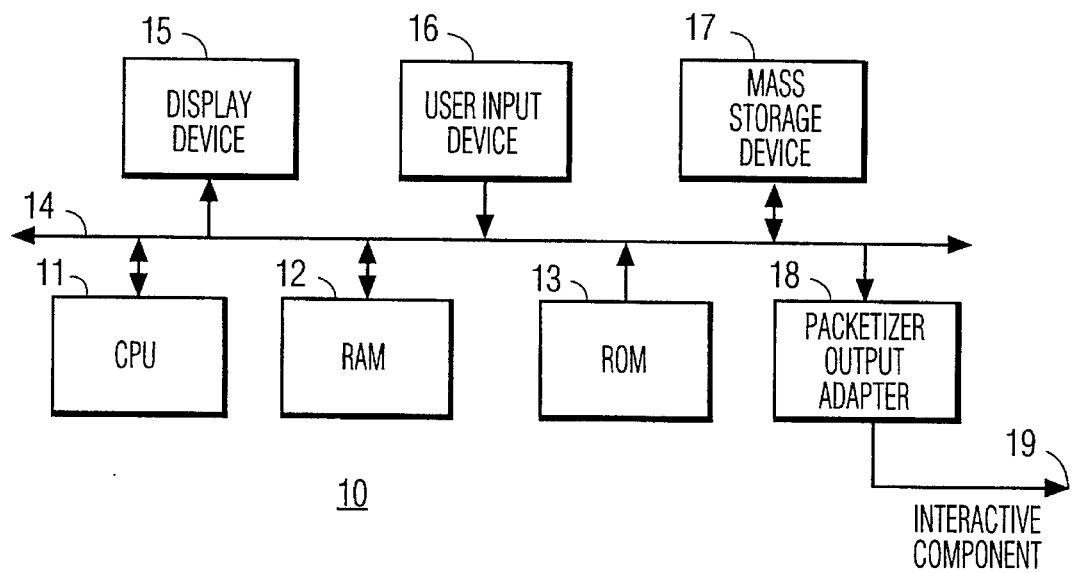

FIG. 2 is a block diagram of a data processing system including a flow builder 10 in accordance with the present invention. In FIG. 2, a central processing unit (CPU) 11 is coupled to a read/write memory (RAM) 12 and a read-only memory (ROM) 13 via a system bus 14. The data processing system of FIG. 2 further includes a display device 16, for providing data to the application programmer, and a user input device 15, for receiving data from the application programmer, both also coupled to the system bus. A mass storage device 17, also coupled to the system bus, may be used for temporarily storing files containing application files, flow data files, and application builder programs used by the application programmer. The CPU 11, RAM 12, ROM 13, display device 15, user input device 16 and mass storage device 17 operate in a known manner as a data processing system, and their operation will not be described in detail. For example, the data processing system of FIG. 2 as described thus far may be embodied in a known personal computer (PC) or workstation. Other known devices may also be coupled to the system bus in the data processing system, such as network adapters, modems, printers, bus extenders, etc.

An additional output port is provided by a packetizer output adapter 18, which is the interface to the transport processor 20 (of FIG. 1). The packetizer output adapter 18 is also coupled to the system bus 14 and may be simply a serial or parallel output port, such as are currently used to interface to printers. However, a specially designed output adapter may be required. One skilled in the art of data processing system interface design will understand how to design and implement any such output adapter. An output terminal of the packetizer output adapter 18 is coupled to an output terminal 19 of the flow builder 10. Output terminal 19 is coupled to the input terminal of the transport packetizer 20.

Referring to FIG. 1 and FIG. 2, in operation, the application programmer generates source data for the code and data files using the user input device 16 and display device 15. The source data is temporarily stored in the mass storage device 17. A compiler, also stored in the mass storage device 17, in an application builder translates the source data into executable code files and associated data files in a known manner, and stores these files in the mass storage device 17. In a similar manner, the application programmer generates source flow data for specifying modules to be included in the interactive component and their characteristics, and for scheduling the insertion of the modules into the interactive component data stream. The content of this source data will be described in more detail below. The flow builder 10 processes the source flow data, associates code and data files with modules, schedules the insertion of the modules into the application component data stream, and generates that data stream. The output of the flow builder 10 is the interactive component data stream with each specified module in that data stream properly sequenced and appearing at the proper time. That output is supplied to the transport packetizer 20 via the output terminal 19. The transport packetizer 20 packetizes the interactive component data stream in a known manner. The packetized data stream, and the packetized video and audio components are multiplexed in multiplexer 30 to form the AVI data stream, also in a known manner.

Figure 3:
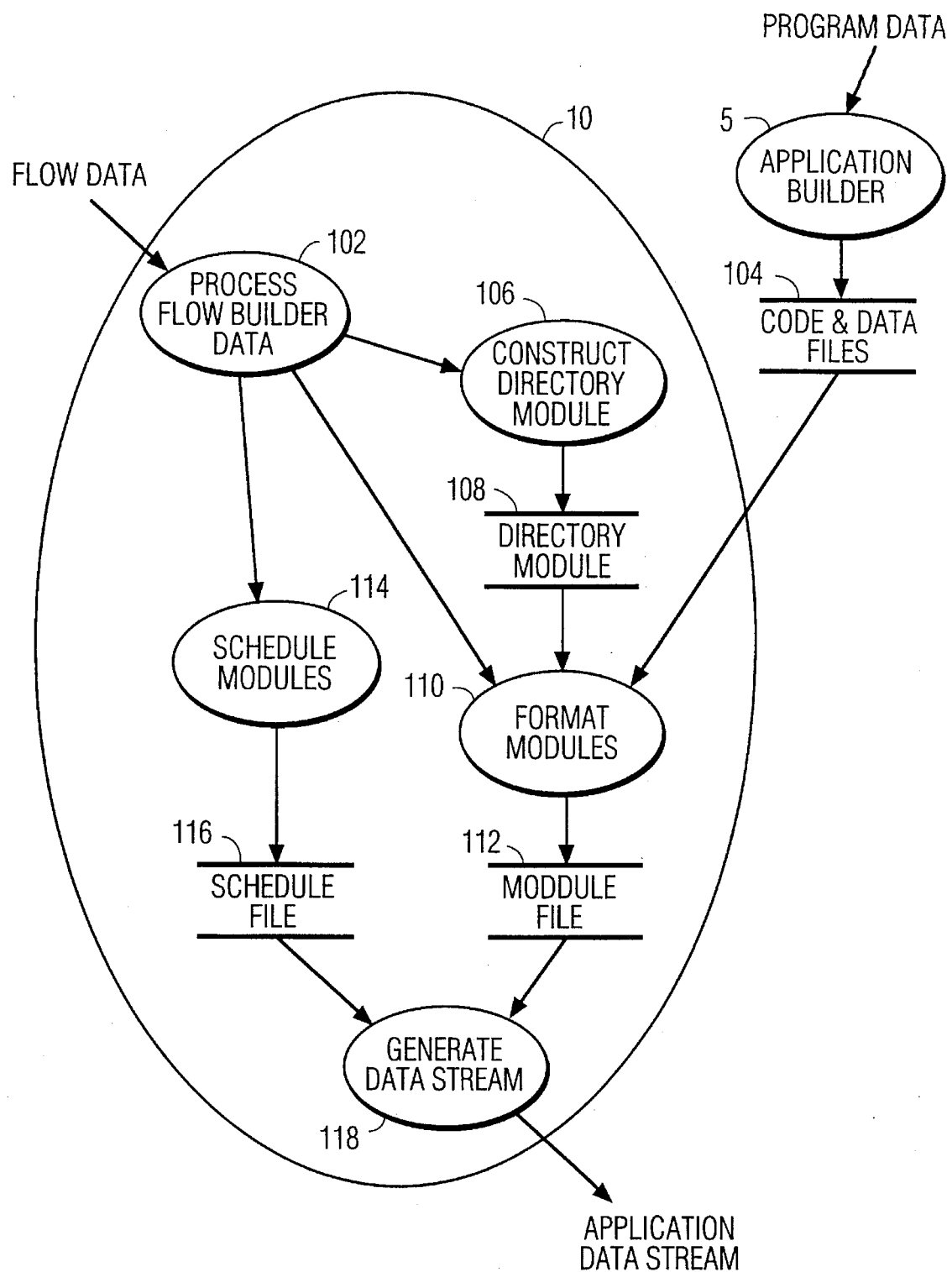
FIG. 3 is a data flow diagram illustrating the operation of the flow builder illustrated in FIG. 1.

FIG. 3 is a data flow diagram illustrating the operation of the flow builder 10 illustrated in FIG. 1 and FIG. 2. In FIG. 3, an application builder 5 receives from the application programmer, source data representing the interactive application program, consisting of executable code and data. The application builder 5 produces a file set 104 containing the code and data files. It is also possible to generate modules within the flow builder 10. For example, signal modules and/or small data modules may be generated within the flow builder 10, and processed internally. (While any type of module may be so generated, code and larger data modules are more practically produced by the application builder 5.) The remainder of FIG. 3 illustrates the data flow through the flow builder 10.

The flow builder 10 analyzes source flow data provided by the application programmer. The format of the source flow data will be described in more detail below. The flow data includes: (1) data relating to the application; (2) data specifying modules to be included in the application and their characteristics; (3) data associating code and data files with modules; and (4) data for scheduling the appearance of the modules in the application component data stream. The flow data is processed, more specifically, parsed, in process 102. The data relating to the application and the data specifying modules and their characteristics is directed to process 106. Process 106 constructs a directory module and stores the constructed directory module in a directory file 108.

Figure 4:
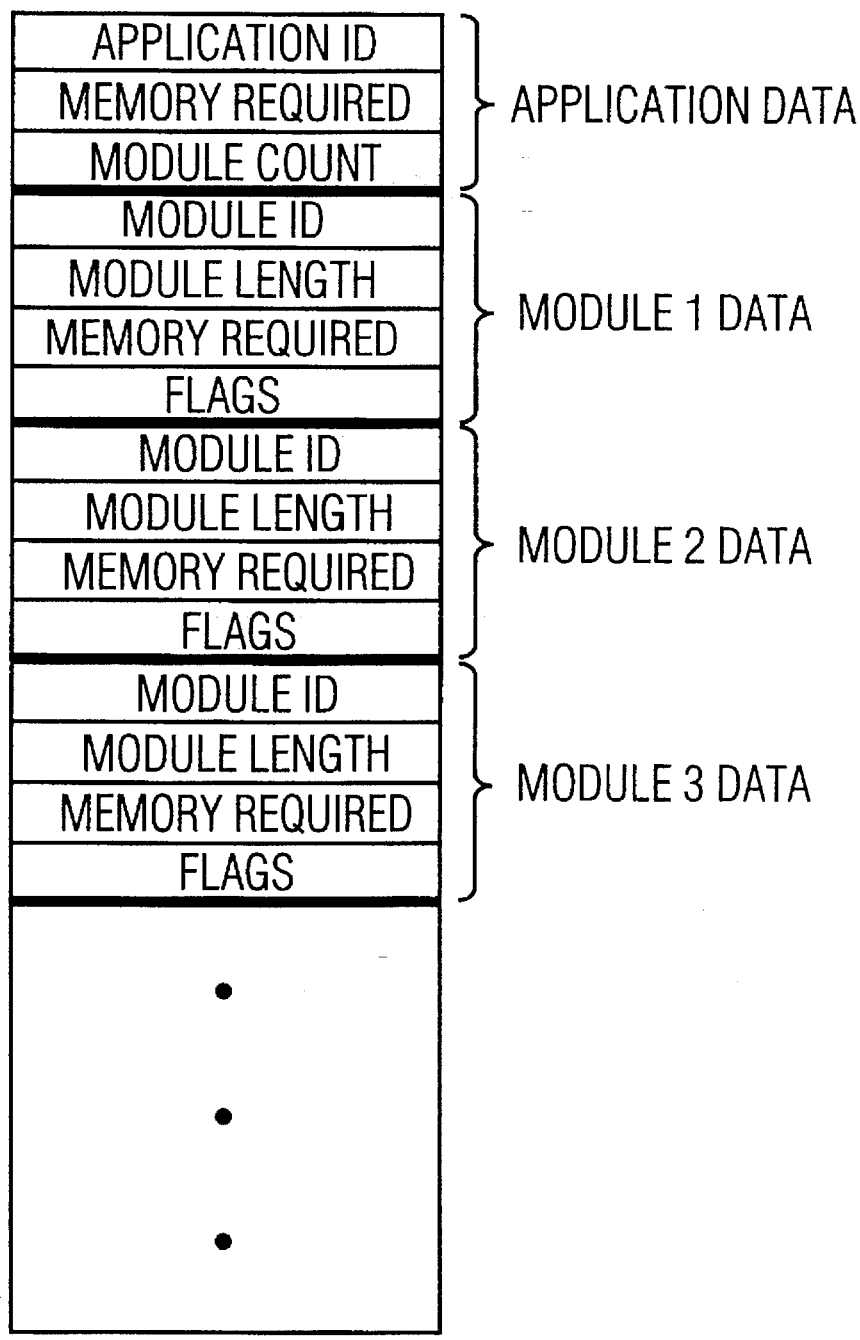
FIG. 4 is a memory layout diagram illustrating the structure of a directory file, useful in understanding the operation of the flow builder illustrated in FIG. 3.

FIG. 4 is a memory layout diagram illustrating the structure of the directory file 108. In FIG. 4, data fields in the directory file 108 are illustrated by horizontal bands, and records are separated by thick horizontal lines. The directory file 108 has a first record containing application data including an identifier for the application, the decoder memory required to run the application, and the total number of modules in the application. When data related to the application is received by process 106, it is stored and analyzed. Appropriate data is placed in corresponding fields in the first record of the directory file 108. The directory file 108 further has a record for each module in the application including a module identifier, the module length the memory required to run this module, and other flags. When data specifying a module and its characteristics is received by process 106, it, too, is stored and analyzed. If this data relates to a newly defined module, then a new record is created in the directory file 108. Appropriate module data is then placed in corresponding fields in the new record. As data is received by process 106, the fields in previously defined records may be updated. For example, each time a module is newly defined, the field in the application record specifying the total number of modules in the application is updated by being incremented.

A source flow data statement containing application data is:

Application(APPLN_ID,APPLN_MEMORY)

(Actual programing statements may be of different form, and/or contain different or additional arguments, which have been omitted for clarification. Further, one skilled in the art of system programing will be able to select a programing paradigm, such as object oriented programming, and a programing environment, such as a C++ programming environment, for generating and processing such programming statements) When process 102 recognizes this statement in the flow data, it is directed to the construct directory module process 106, which initializes the directory module file 108, and inserts the application identifier (APPLN_ID) and the application memory required (APPLN_MEMORY) into the corresponding fields in the first record.

There are four possible source flow data statements for specifying modules and their characteristics:

appAutoExec(MODULE_ID,MODULE_MEMORY)

appCode(MODULE_ID,MODULE_MEMORY)

appData(MODULE_ID,MODULE_MEMORY)

appSignal ( )

The first programing statement identifies the auto-exec module containing code which is automatically executed when the interactive component is first detected in the receiving location. The second programing statement identifies a module containing executable code and the third identifies a module containing data. When one of these programming statements is recognized by process 102, it is directed to the construct directory module process 106, which creates a new module record, and inserts the module identifier (MODULE_ID) and module memory required (MODULE_MEMORY) into the corresponding fields in the newly created module record. The last of these programming statements specifies a signal module. This is a special module for sending signals to the receiving location. In the preferred embodiment, a signal module is limited to 120 characters, and is not assigned a module name.

Referring again to FIG. 3, as the flow data is parsed in process 102, the data associating code and data files with modules is supplied to process 110. Process 110 retrieves the appropriate code and or data file from the file set 104 and data from the associated module record in the directory file 108. Using the retrieved data, process 110 formats and generates a file containing the data for that file and stores it in the module file set 112.

Figure 5:
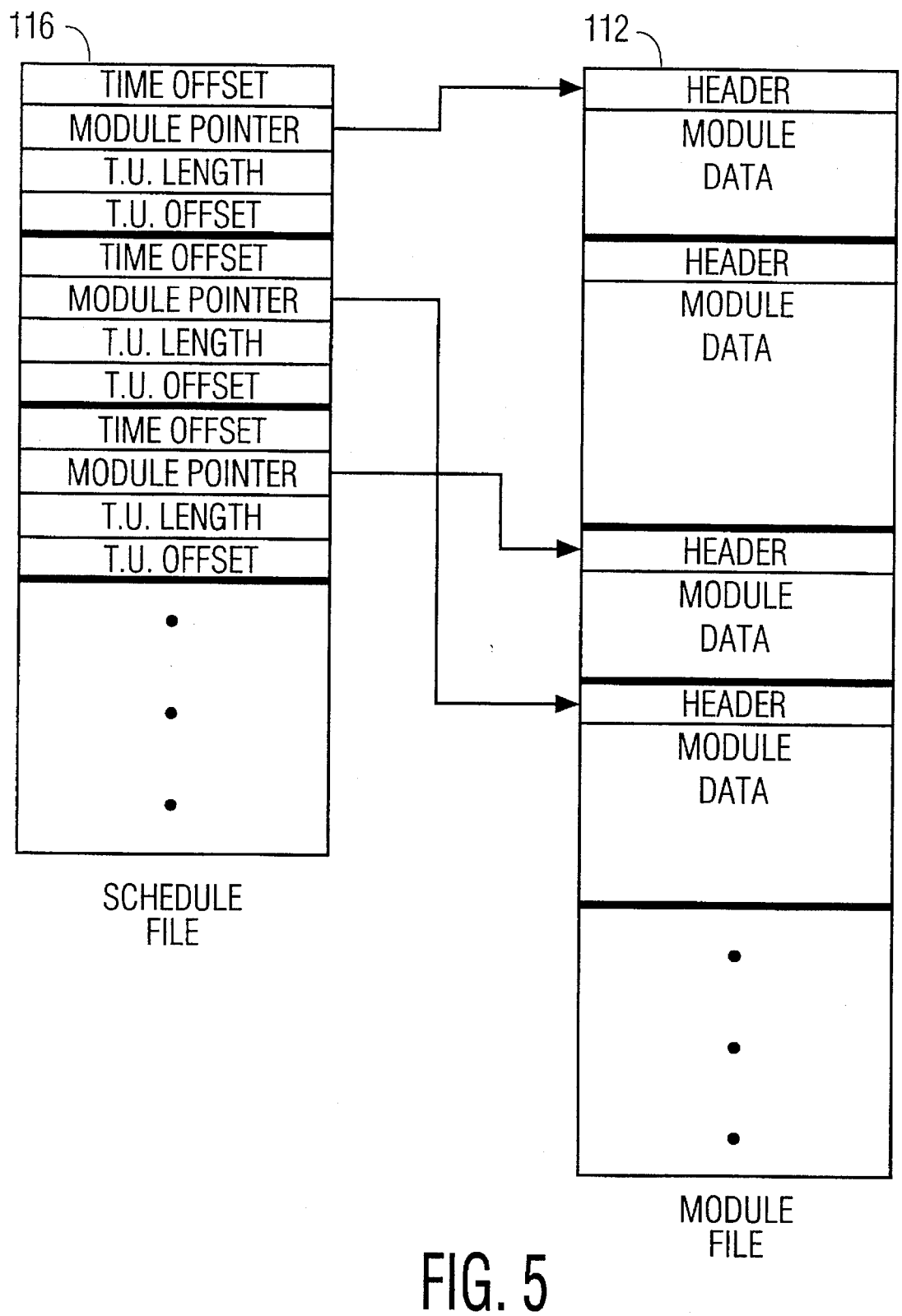
FIG. 5 is a memory layout diagram illustrating the structure and relationship of a module file and a schedule file used in the flow builder illustrated in FIG. 3.

The right-hand side of FIG. 5 is a memory layout diagram illustrating the structure of a module file 112. Each module included in the interactive component data stream has a record in the module file 112, containing the data actually making up the module, as it will be transmitted over the transport medium to a receiving location. As shown in FIG. 5, each module contains a header field, containing data relating to the module, and a module data field. The header field includes the module identifier; a module version number and the length of the module, which in this case will include a cyclical redundancy check (CRC) code. Some of this information may be determined from the code or data file in the file set 104, and some may be supplied by the module related data maintained by process 106. The module data field contains the executable code or data making up that module, which is retrieved from the specified code or data file in the file set 104. In a preferred embodiment, the header data field will be formed into a header packet, and the module data field will be packetized into a plurality of equal size data packets in the transport packetizer 20 (of FIG. 1).

Source flow data statements containing data associating code and data files with modules are:

MODULE_ID.moduleSource(ModuleFile)

or

MODULE_ID.moduleSource(ModuleBuffer)

The first statement associates a code or data file from the file set 104 with a previously defined module; the second associates a memory buffer, previously defined by appropriate programing statements (not shown) in the source flow data, with a previously defined module. The second statement allows the application programmer to define the module data in the source flow data, as described above. When process 102 recognizes either one of these two statements in the flow data, it is directed to the format modules process 110, which creates a new record in the module file 112, and places the module identifier (MODULE_ID) from the programing statement, the module version number (which is automatically maintained by the process 110 if this statement is called multiple times for the same module), and the module length (from the corresponding record in the directory file 108) into the header field of the newly created record in the module file 112. Then the contents of the specified code or data file from the file set 104 (for the first statement) or the memory buffer (for the second statement) are copied into the module data field of the newly created record in the module file 112.

Referring again to FIG. 3, as the flow data is parsed in process 102, the data for scheduling the appearance of the modules in the application component data stream is directed to process 114. The process 114 collects all the scheduling information provided by the application programmer. The collected scheduling data may contain both required schedule times, and optional schedule times for modules. The different types of scheduling requests will be described in more detail below. When all the information has been collected, an instruction is given to process 114 to schedule the modules. The collected scheduling data is then processed and an attempt is made to schedule the modules according to the collected scheduling data. If all of the required schedule times cannot be satisfied, then the scheduling request fails, and diagnostic messages are returned to the application programmer. Otherwise timing information for placing the modules in the interactive component data stream is generated, and stored in a schedule file 116. The process for generating the schedule file 116 will be described in more detail below.

The left-hand side of FIG. 5 is a memory layout diagram illustrating the structure of a schedule file 116. The schedule file 116 has one record for each appearance (also called an instance) of a module in the interactive component data stream, containing a time offset of that appearance from the beginning of the interactive program, a pointer to the record in the module file 112 containing the module data to be placed in the interactive component data stream at the time offset, the length of the transmission unit to be placed in the data stream, and the offset within the module data field of the data to be included in the scheduled transmission unit. The records in the schedule file 116 are maintained in time offset order, from the record relating to the first scheduled module to that relating to the last scheduled module. More detail about these fields will be supplied below.

In FIG. 5, the first record in the schedule file 116 contains schedule data for inserting the first module in the module file 112 into the interactive component data stream, as illustrated by the arrow running from the module pointer field of that record to the first record in the module file 112. The second record in the schedule file 116 relates to the fourth module in the module file 112, and the third record in the schedule file 116 relates to the third module in the module file 112.

As described above, an application programmer may supply schedule data to the flow builder 10 containing required and optional schedule times. In a preferred embodiment, there are four categories of module scheduling requests: directory modules, fixed time modules, flex time modules, and max-insert modules.

As described above, the process 106 in the flow builder 10 automatically generates a directory module in response to flow data from the application programmer. The schedule modules process 114 automatically places an instance of the directory module at the beginning (time offset=0) of the interactive component data stream. In the preferred embodiment, this cannot be changed, so a required scheduling request for any other module at this time will result in a conflict which is an error, and a diagnostic message will issue.

Other instances of the directory module may be scheduled in response to flow data from the application programmer, using one of the two programming statements:

insertDirectory(insertionTime)

or insertDirectory(insertionTime,moduleSpacing,insertionDuration).

The first statement requests that an instance of the directory module be inserted into the interactive component data stream at the time offset insertionTime. The second statement requests that multiple instances of the directory module be inserted starting at the time offset insertionTime, and spaced apart by time offsets moduleSpacing for a duration of insertionDuration. If the insertionDuration argument is omitted, then multiple instances of the directory module are inserted until the interactive program ends. Data relating to the insertion requests represented by these programming statements (and all those which follow) are temporarily stored in internal data structures (not shown) in the flow builder 10. In the absence of any such scheduling requests from the application programmer, the directory module is scheduled automatically at the same frequency as the auto-exec module (described below).

Fixed time module requests are made using the following programming statement:

MODULE_ID.insertModule(insertionTime).

This statement requests that an instance of the module MODULE_ID be inserted into the data flow at the time offset insertionTime. Any number of such scheduling requests may be made for any module. Fixed time schedule requests are required schedule requests. All of the fixed time schedule requests must be satisfied without conflicts in order for the schedule to be successful. Data relating to all such scheduling requests are stored in internal data structures in the flow builder 10.

Flex-time module schedule requests are those for which some flexibility in scheduling times is available. There are several types of flex-time module schedule requests. A first type, is a request for a single instance of the requested module to be inserted into the interactive component data stream at the first available time after the current system time, which is a time offset value maintained by the flow builder 10 using programing statements which are not described herein. A programing statement for requesting scheduling this type of a flex-time module is:

MODULE_ID.insertModule( )

which is the same form as the fixed time module schedule request (above) with no insertion time offset specified.

A second type of flex-time module schedule request is one for multiple instances of the requested module to be inserted into the interactive component data stream. A programing statement for requesting scheduling of this type of a flex-time module is:

MODULE_ID.insertModule(insertionTime,moduleSpacing,insertionPeriod)

This statement requests that multiple instances of the requested module, MODULE_ID, be inserted into the interactive component data stream. The first instance is to be inserted at the first available time offset after insertionTime. Intervals between instances of the requested module, MODULE_ID, are of the time offset interval moduleSpacing. Instances are inserted for the time offset duration insertionPeriod from insertionTime. If the insertionPeriod argument is omitted, then multiple instances of the requested module are inserted between insertionTime and the end of the interactive application. If any of the multiple instances cannot be scheduled, then the scheduling fails, and a diagnostic message is issued.

A programing statement for a max-insert module schedule request is:

MODULE_ID.insertModule(insertionTime,MAXIMUM_INSERTION,insertionPeriod).

This statement is similar to the multiple-instances form of the flex-time module request (above) with a predefined constant, MAXIMUM_INSERTION, supplied as the moduleSpacing argument. In this case, as many instances of the requested module, MODULE_ID as will fit will be inserted into the interactive component data stream during the insertionPeriod time offset duration. However, in this case, if no instance can be scheduled, the scheduling still succeeds, thus, no diagnostic message is issued.

As described above, after all the scheduling requests have been received and processed, an instruction is supplied to schedule the interactive component data stream. A programing statement for such an instruction is:

scheduleFlow( ).

In response to this instruction, the previously stored data representing all of the previously entered scheduling requests, stored in internal data structures in the flow builder 10, as described above, is analyzed, and the schedule file 116 is generated.

In general, when any module request is scheduled, the starting time offset in the interactive component data stream is determined from the request, and the ending time offset for that module is determined from the length of the module and the transmission rate of the interactive component. The block of time represented by the schedule request is checked against already scheduled modules to determine whether any conflict exists. If a conflict exists, then a resolution action is taken, which depends upon the type of schedule request (fixed time, flex time, etc.) being processed. Otherwise, a new record is created in the schedule file 116 (of FIG. 5) representing the newly scheduled module.

Referring to FIG. 5, in the new record in the schedule file 116, the starting time offset is inserted into the time offset field and a pointer to the entry in the module file 112 containing the module which is to be transmitted at that time offset is inserted into the module pointer field. The length of the module is retrieved from the module header, and inserted into the transmission unit length field, and the transmission unit offset is initially set to 0. These last two fields may be changed as a part of conflict resolution procedures in a manner described below.

Figure 6:
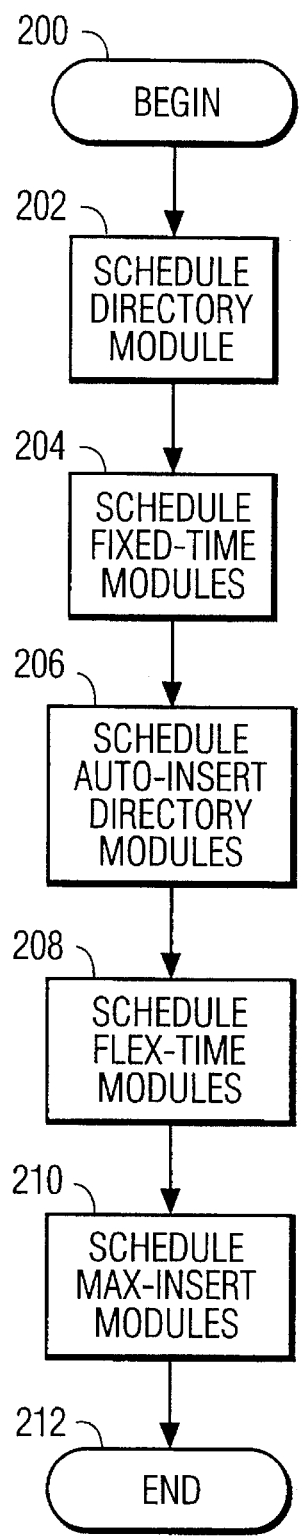
FIG. 6 is a flow diagram of the processing performed by the scheduling modules in the flow builder illustrated in FIG. 3.

FIG. 6 is a flow diagram of processing 200 performed by the schedule modules process 114 of FIG. 3 in response to the scheduleFlow( ) programing statement, and FIG. 7 is a timing diagram useful in understanding the scheduling process illustrated in FIG. 6. In FIG. 7, modules are represented as rectangles, with identifiers of the modules inside the rectangles, on respective timelines, each timeline representing the same portion of the interactive component data stream at different times in the scheduling process.

In FIG. 6, the process begins in step 202. In step 204, the first directory module is inserted into the interactive component data stream at time offset 0, as described above. Referring to FIG. 5, the first record in the schedule file 116 represents this first directory module, and the first record in the module file 112 contains the directory module. In this case, the value in the time offset field is 0, and the module pointer points to the directory module entry in the module file 112. The transmission unit length contains the length of the directory module, and the transmission unit offset is 0. Referring to FIG. 7, timeline a) illustrates the data stream after insertion of this first directory module 300 at time 0.

In step 206, all fixed time module requests are scheduled. As described above, fixed time module requests may be for any kind of module, including directory modules. First, all fixed time directory module requests are scheduled. Then the remaining fixed time modules requests are scheduled in the order in which those requests occur in the source data flow (of FIG. 3). As above, the starting and ending time offsets for each fixed time module request are determined. If either of these time offsets overlaps a previously scheduled module, then a conflict exists. In this case, the scheduling fails, and a diagnostic message is issued.

For example, timeline b) of FIG. 7 illustrates the data stream after completion of step 206. In this example, a fixed time directory module request was made for time t1. In response to this request, an instance 302 of the directory module was inserted in the data stream. Then a fixed time module request for the auto-exec module was made for time t2, and a fixed time module request for the code 1 module was made for time t3, in that order. In response to these requests, an instance 304 of the auto-exec module was inserted into the data stream at time t2, and an instance 306 of the code 1 module was inserted into the data stream at time t3. If a fixed time module request were subsequently made for time t4, however, a conflict with previously scheduled code 1 module would result, the scheduling would fail, and a diagnostic message would be issued.

In step 208, those directory module schedule requests which either are multiple instance flex time requests by the application programmer or automatically generated (at the same repetition rate as the auto-exec module, as described above) by the flow builder 10 are processed. The multiple instances of the directory module are scheduled starting from the first requested or automatically generated instance to the last (i.e. the end of the interactive program). For each requested instance, a desired starting time is calculated. If a module is already scheduled at the desired starting time, then a time as close as possible to the desired starting time when no other module has been scheduled is sought, either before or after the desired starting time. A directory module is then scheduled beginning at that time.

If the complete directory module cannot fit within the available time slot, then the directory module is split into multiple transmission units. As much as will fit in the first available time slot is inserted into a transmission unit in the data stream, and the remainder of the directory module is fit into transmission units occupying all following available time slots until the complete directory module has been transmitted. If the last transmission unit for the directory module extends past the desired starting time of the next directory module instance, then the scheduling fails and a diagnostic message results.

Referring to FIG. 5, when a module is split, a separate record in the schedule file 116 is created for each transmission unit inserted into the data stream. The first record is created with the time offset being the starting time of the first portion of the module, and the module pointer pointing to the record in the module file 112 containing the desired module (in this case, the directory module). The transmission unit length is set to the number of bytes which can be transmitted in the first portion, and the transmission unit offset is set to 0. A second record in the schedule file 116 is then created with the time offset being the starting time of the next available time slot in the data stream, and the module pointer still pointing to the record in the module file 112 containing the desired module. In this case, the transmission unit length contains the number of bytes which can be transmitted in the second portion, and the transmission unit offset is set to point to the next byte within the module field in the desired module record in the module file 112 to be transmitted. Successive records in the schedule file 116 are similarly created until the complete module has been transmitted.

Referring now to FIG. 7, timeline c) illustrates the time line after completion of step 208. In this example, a programmer flex-time directory module request was made to insert multiple instances of the directory module beginning at desired time t5, with module spacing SPACING between instances until the end of the interactive component data stream. In this case the desired time t5 overlaps the previously scheduled auto-exec module 304. The closest available time to t5 is time t6, i.e. the end of the auto-exec module 304. There is sufficient free time to transmit the entire directory module, so an entry in the schedule file 116 is made to insert a complete instance 308 of the directory module into the data stream at time t6. The desired starting time for the next instance of the directory module is at time t7. This time is available, however, there is not sufficient time to contain a complete instance of a directory module, and the directory module must be split.

A first portion 310 of the directory module instance (labeled "D") begins at time t7, and ends at time t3, which is the starting time of the previously scheduled code 1 module instance 306. A second portion 312 of the directory module instance (labeled "IR") begins at time t8, which is the end of the code 1 module instance 306, and ends at time t9. The combination of the first portion 310 and second portion 312 contains a complete instance of the directory module, as indicated in FIG. 7 by the line linking portions 310 and 312.

As described above, two records in the schedule file 116 (of FIG. 5) are generated for this instance of the directory module. The first record is placed before the code 1 module record, and contains a time offset of t7, a transmission length field containing the number of bytes B1 in the first portion and a transmission unit offset of 0. The second record is placed after the code 1 module record, and contains a time offset of t8, a transmission length field containing the number of bytes B2 in the second portion,, and a transmission unit offset of B1+1. The module pointer for both records points to the record in the module file 112 containing the directory module.

Referring again to FIG. 7, the desired starting time for the next instance of the directory module is time t10, which is time t7+SPACING. Because this time is available, and there is sufficient available time for a complete instance of the directory module, a single record in the schedule file 116 (of FIG. 5) is made to insert an instance 314 of the directory module into the data stream beginning at time t10, in the manner described above. If the ending time t9 of the previous instance (310,312) of the directory module were later than the desired starting time of the next instance, t10 (which could have occurred, for example, if the duration of the code 1 module instance 306 were longer) then the scheduling would have failed, and a diagnostic message would have issued. The above process of inserting instances of the directory module spaced apart by SPACING continues until the interactive component program ends. It is also possible to specify a time duration for inserting multiple instances of a module into the data stream (as described above). If such a request had been made, directory module instances would be inserted so long as the desired starting times for the instances is within the specified time duration.

Referring again to FIG. 6, in step 210, flex-time modules are scheduled. As described above, there are two types of flex-time module requests. The first type is a single instance flex-time module request, and the second type is a multiple instance flex-time module request. In step 210, first all single instance flex-time module requests (which may include requests for single instances of directory modules) are scheduled in the order in which they were supplied by the application programmer in the source flow data. As above, a desired starting time is determined from the request in the source flow data. If the desired starting time is available, then a record is created in the schedule file 116 with the desired starting time stored in the time offset field and the module pointer pointing to the record in the module file 112 containing the desired module. The module may be split into sections, as described above, if the available time is not sufficient to carry a complete instance of the desired module. If the desired starting time is not available, then the desired module is inserted at the next available time, and may be split into portions if necessary. As described above, an insertion period may be specified by the application programmer. If the desired module cannot be scheduled within the insertion period of the desired starting time, the schedule fails and a diagnostic message is issued.

Referring to FIG. 7, timeline d) illustrates the data stream after completion of the first portion of step 210. In timeline d) a request to schedule an instance of a signal module S at time t3 within an insertion period PERIOD is processed. Time t3 is not available, however, so the next available time slot is sought. This time slot is at time t9, which is the end of the second portion 312 of an instance of the directory module. Because this time slot is within the insertion period PERIOD, an instance 316 of the signal module S is inserted into the data stream starting at time t9, in the manner described below. If the insertion period PERIOD were shortened so that it did not extend to time t9, then this schedule request would fail, and a diagnostic message would be issued.

Referring again to FIG. 6, the multiple instance flex-time module requests are then scheduled in step 210. All requested instances of a module are scheduled before the next module request is scheduled. The scheduling process for any such scheduling request is the same as that for the multiple instance directory module requests, described in detail above, and will not be described in detail here. Instances are scheduled starting from the first desired instance in the data stream to the last. A desired starting time is determined from the scheduling request. If the desired starting time is available, a record is created in the schedule file 116 for inserting an instance of the desire module at that time. If the desired time is not free, then the next available time is sought, and the instance is inserted at that time. If there is not sufficient time to insert a complete instance, then the instance is split into several portions. If a complete instance cannot be scheduled before the desired starting time of the next instance, then the scheduling fails, and a diagnostic message is issued.

The order in which the multiple instance flex-time module requests are scheduled may be affected by the application programmer in two ways. First, each module may be given a priority by a programming statement in the source flow data. A programming statement for assigning a priority to a module is:

MODULE_ID.setPriority(priorityValue).

In a preferred embodiment, a priorityValue of 0 is the highest priority, with lower values having higher priority than higher values. When multiple instance flex-time module requests are being scheduled, all instances of modules having higher priorities are scheduled before any instances of lower priority modules are scheduled.

Second, even if the application programmer does not set a priority for any modules, modules receive a priority in accordance with the order in which they are defined in the source flow data with modules defined earlier in the source flow data having a higher priority than those defined later. In this case, when multiple instance flex-time module requests are being scheduled, all instances of modules defined earlier in the source flow data are scheduled before any instances of modules defined later are scheduled.

Referring again to FIG. 7, timeline e) illustrates the data stream after the second portion of step 210 has completed. In timeline e), a flex-time request to insert multiple instances of a data module starting at time t10, with module spacing SPACING between instances is processed. Because time t10 is not available, an instance 318 of the data module is inserted at the next available time t11. The next desired insertion time, t12, is SPACING time after the time t10. Again, time t12 is not available, so the next instance 320 of the data module is inserted at the next available time t13. The next desired time, t14, is SPACING time from time t12. This time is available, so an instance 322 of the data module is inserted at time t14 (only partially shown in FIG. 7).

Referring again to FIG. 6, all maximum insert module requests are then processed in step 212. Each maximum insert module request includes a starting time and a time period over which as many instances of the requested module are inserted into the data stream as are possible. For any single instance, the next available time is sought. A record is created in the schedule file 116 with the time offset being set to this time, and the module pointer pointing to the record in the module file containing the desired module. If there is sufficient time to insert a complete instance of the desired module, then the transmission unit length is set to the length of the module and the transmission offset is set to 0. Otherwise, the module is split, as discussed above.

There may be many maximum insert module requests submitted by the application programmer. The priority assigned to each module (either explicitly by the application programmer using the setPriority programming statement, or by the position of the module definition statements in the source data flow, as described above) affects the scheduling of instances of the modules. Starting at highest priority level, one item from each requested item at that priority level is scheduled at the next available time. Then the next lower priority level is processed, again scheduling one instance from each requested item at that priority level at the next available time. This continues until one instance of each item at the lowest priority level is scheduled. Then the process repeats from the highest priority level. The flow builder 10 loops through the priority levels scheduling instances until no more time remains available.

Referring to FIG. 7, maximum insert module requests have been processed for three small data modules, A, B and C, with A having the highest priority level, B having the middle priority level and C having the lowest priority level. Because data module A has the highest priority, one instance 324 of data module A is scheduled first at the next available time t15. Then one instance 326 of the next lower priority data module B is scheduled at the next available time t16. Then one instance 328 of the next lower priority data module C is scheduled at the next available time t17. Because module C has the lowest priority, flow builder 10 loops back to the highest priority level. Again one instance 330 of the highest priority data module A is scheduled at the next available time t18. Then one instance 332 of the next lower priority data module B is scheduled at the next available time t19. Then one instance of the lowest priority data module C is scheduled at the next available time t20. However, a complete instance of module C will not fit in the available time starting with time t20, so data module C is split into two portions, in the manner described above. A first portion 334 is scheduled at time t20, and a second portion 336 is scheduled at time t21. This continues until all available time slots are filed with instances of data modules A, B and C.

Referring again to FIG. 3, when all of the available time has been filled with maximum insertion modules the schedule file 116 is complete. Then, process 118 generates the interactive component data stream in real time by processing the data in the schedule file 116 and the module file 112. The process 118 receives a clock signal (not shown) from a system clock (also not shown) in the transmission system (of FIG. 1). When an interactive program is initiated, the first record in the schedule file is read by the process 118. Then the time from the system clock is compared to the time offset field in that first record. When the system clock time is the same as the time offset, it is time for the scheduled module to be packetized. First, header data is supplied to the packetizer 20 (of FIG. 1). This data includes the module identifier, the total number of bytes in the module and the module version number from the header field in the module file 112, and the transmission unit length and offset from the corresponding fields in the schedule file 116. This header data is packetized into a single packet of a special type called a header or auxiliary packet. Second, module data from the record of the module file 112 pointed to by the module pointer is retrieved from the module file 112, and supplied to the transport packetizer 20. The transmission unit length field from the current record in the schedule file 116 indicates the number of bytes of module data to be supplied to the transport packetizer 20, and the transmission unit offset field indicates the starting location in the module data field of the indicated record in the module data file 112 for the module data. The transport packetizer 20 packetizes the module data in successive packets and supplies it to the multiplexer 30, which in turn combines the interactive component packets with the video and audio packets, and supplied the multiplexed packet stream to the transport medium. Then process 118 reads the next record and repeats the process until the interactive process concludes.

What is claimed is:

1. A method for generating an interactive component data stream, representing an executable application program, for an audio video interactive (AVI) composite signal, comprising the steps of:

generating executable program files representing the executable application program;

generating flow data including data representing the application program, data specifying modules, data associating program files with modules and data representing scheduling of modules, which flow data defines a data structure of the interactive component;

formatting modules, responsive to the data associating program files with modules;

scheduling modules into a data stream, responsive to the data representing the scheduling of modules, said scheduling including:

determining if a requested schedule time overlaps a previously scheduled instance of a module;

setting an instance starting time to the requested schedule time, if the requested schedule time does not overlap a previously scheduled module;

determining if there is sufficient time to insert a complete instance of the specified module into the data stream;

inserting a complete instance of the module into the data stream at the instance starting time if there is sufficient time, and inserting the module into a successive plurality of available time slots in the data stream beginning at the instance starting time, otherwise; and;

wherein one of the successive scheduling requests is a request to schedule a directory module at a requested schedule time; and transmitting said executable application program as defined by said data stream.

2. The method of claim 1 further comprising the steps of:

parsing the flow data into data representing the application program, data specifying modules and their characteristics, data associating program files with modules and data representing scheduling of modules in the interactive component; and constructing a directory module, responsive to the data representing the application program and the data specifying modules and their characteristics.

3. The method of claim 2 wherein the scheduling modules step comprises the step of first scheduling a directory module as the first module in the data stream.

4. The method of claim 2 wherein:

the module scheduling representative data comprises successive scheduling requests each specifying a module, each request being selected from the set consisting of: a fixed time module request, a flexible time module request, and a maximum insert module request; and the scheduling modules step comprises the steps of:

automatically scheduling the directory module as the first module in the data stream; then scheduling fixed time module requests in the data stream; then if no scheduling request specifying the directory module is among the successive scheduling requests, then automatically scheduling directory modules into the data stream; then scheduling flexible time module requests into the data stream; then scheduling maximum insert module requests into the data stream.

5. The method of claim 4 wherein:

one of the successive scheduling requests specifies an auto-exec module; and the step of automatically scheduling directory modules if no scheduling request specifying the directory module is among the successive scheduling requests comprises the step of scheduling directory modules at the same frequency in the data stream as the auto-exec module.

6. The method of claim 1 wherein:

the scheduling request is a request to schedule a fixed time module at a requested schedule time; and the conflict determining step comprises the steps of:

determining an insertion starting time from the requested schedule time;

determining an insertion ending time from the size of the identified module and a predetermined transmission speed;

determining if either one of the insertion starting time and the insertion ending time overlaps a previously scheduled instance of a module; and finding a conflict if either one of the insertion starting time and the resulting insertion ending time overlaps a previously scheduled instance of a module; and the conflict resolution step comprises the steps of:
  finding that the scheduling step has failed; and
  issuing a diagnostic message.

7. A method for generating an interactive component data stream, representing an application program, for an audio video interactive (AVI) composite signal, comprising the steps of:
  generating program files representing the application program;
  generating flow data defining a data structure of the interactive component;
  parsing the flow data into data representing the application program, data specifying modules and their characteristics, data associating program files with modules and data representing scheduling of modules in the interactive component;
  constructing a directory module, responsive to the data representing the application program and the data specifying modules and their characteristics;
  formatting modules, responsive to the data associating program files with modules;
  scheduling modules into a data stream, responsive to the data representing the scheduling of modules which includes successive scheduling requests, and for each scheduling request:
    determining if a conflict between a scheduling request and previously scheduled modules exists;
    performing a conflict resolution process if a conflict exists;
    scheduling an instance of a specified module in the data stream if a conflict does not exist; and
  one of the successive scheduling requests is a request to schedule a flexible time module at a requested schedule time; and the instance scheduling step includes the steps of:
    determining if the requested schedule time overlaps a previously scheduled instance of a module;
    setting an instance starting time to the requested schedule time, if the requested schedule time does not overlap a previously scheduled module, and setting the instance starting time to the next time in the data stream at which there is no module scheduled, otherwise;
    determining if there is sufficient time to insert a complete instance of the specified module into the data stream from the size of the specified module and a predetermined transmission speed; and
    inserting a complete instance of the module into the data stream at the instance starting time if there is sufficient time, and inserting the module into a successive plurality of available time slots in the data stream beginning at the instance starting time, otherwise.

8. The method of claim 7 wherein:
  the schedule request is a request to schedule the flexible time module at the requested schedule time and within a specified module insertion time period;
  the conflict determining step comprises the steps of:
    determining if the instance starting time is within the insertion time period; and
    finding a conflict if the instance starting time is not within the insertion time period; and
  the conflict resolution step comprises the steps of:
    finding that the scheduling step has failed; and
    issuing a diagnostic message.

9. The method of claim 7 wherein:
  the one of the schedule requests is a request to schedule multiple instances of a flexible time module starting at the requested schedule time spaced apart by a module spacing time;
  the module scheduling step further comprises the step of repeating the instance scheduling step with a desired starting time equal to the previous starting time incremented by the module spacing time until the application program is complete;
  the conflict determining step comprises the steps of:
    determining an ending insertion time for the previously scheduled instance of the specified module;
    determining if the ending insertion time is later than the instance starting time for the current instance of the specified module; and
    finding a conflict if the ending insertion time is later than the instance starting time for the current instance of the specified module; and
  the conflict resolution step comprises the steps of:
    finding that the scheduling step has failed; and
    issuing a diagnostic message.

10. The method of claim 9, wherein:
  a characteristic of a module is a priority value;
  the step of constructing a directory module comprises the step of assigning a priority value to a module in response to the data specifying modules and their characteristics;
  a subset of the successive scheduling requests are requests to schedule a flexible time module at a requested schedule time; and
  the instance scheduling step comprises the steps of:
    initially selecting one of the subset of scheduling requests specifying the module assigned a highest priority value;
    performing the repeating step for the selected scheduling request;
    selecting a next one of the subset of scheduling requests specifying a module assigned the next lower priority value; and
    repeating the performing and selecting steps until the priority value assigned the module specified in the selected scheduling request is a lowest priority value, and then repeating the initial selecting step.

11. The method of claim 9 wherein the repeating step repeats the instance scheduling step until the termination of application program.

12. The method of claim 9 wherein:
  the one of the schedule requests is a request to schedule multiple instances of a flexible time module starting at the requested schedule time spaced apart by a module spacing time for a specified module insertion time period; and
  the repeating step repeats the instance scheduling step starting at the requested schedule time until the end of the insertion time period.

13. The method of claim 7 wherein the specified module is the directory module.

14. A method for generating an interactive component data stream, representing an application program, for an audio video interactive (AVI) composite signal, comprising the steps of:
  generating program files representing the application program;
  generating flow data defining a data structure of the interactive component;

parsing the flow data into data representing the application program, data specifying modules and their characteristics, data associating program files with modules and data representing scheduling of modules in the interactive component;

constructing a directory module, responsive to the data representing the application program and the data specifying modules and their characteristics;

formatting modules, responsive to the data associating program files with modules;

scheduling modules into a data stream, responsive to the data representing the scheduling of modules which includes successive schedling requests, and for each scheduling request;

determining if a conflict between the scheduling request and previously scheduled modules exists;

performing a conflict resolution process if a conflict exists;

scheduling an instance of the specified module in the data stream if a conflict does not exist; and one of the successive scheduling requests is a request to schedule a maximum insertion module at a requested schedule time; and the instance scheduling step includes the steps of:

setting an instance starting time to the next time in the data stream at which there is no module scheduled, starting at the requested schedule time;

determining if there is sufficient time to insert a complete instance of the specified module into the data stream from the size of the specified module and a predetermined transmission speed;

inserting a complete instance of the module into the data stream at the instance starting time if there is sufficient time, and inserting the module into a plurality of available time slots in the data stream beginning at the instance starting time, otherwise; and repeating the setting, determining and inserting steps.

15. The method of claim 14 wherein the repeating step repeats until the termination of application program.

16. The method of claim 14 wherein:

the one of the schedule requests is a request to schedule a maximum insertion module at a requested schedule time for a specified module insertion time period; and the repeating step repeats until the end of the insertion time period.

17. The method of claim 14, wherein:

a characteristic of a module is a priority value;

the data stream generating step further comprises the step of assigning a priority value to a module in response to the data specifying modules and their characteristics;

a subset of the successive scheduling requests are requests to schedule a maximum insertion module at a requested schedule time; and the instance scheduling step further comprises the steps of:

initially selecting one of the subset of scheduling requests specifying the module assigned a highest priority value;

performing the setting, determining and inserting steps for the selected scheduling request;

selecting a next one of the subset of scheduling requests specifying a module assigned the next lower priority value; and repeating the performing and selecting steps until the priority value assigned the module specified in the selected scheduling request is a lowest priority value, and then repeating the initial selecting step.

18. The method of claim 14 wherein the repeating step repeats until the termination of application program.

19. The method of claim 14 wherein:

the one of the schedule requests is a request to schedule a maximum insertion module at a requested schedule time for a specified module insertion time period; and the repeating step repeats until the end of the insertion time period.

20. Apparatus for generating an interactive component for an audio video interactive (AVI) composite signal, the interactive component representing an application program, comprising:

a source of data representing the application program;

an application builder, responsive to the application program data source, for generating program files;

a source of flow data defining a data structure of the interactive component, said flow data consisting of data representing the application program, data specifying modules and their characteristics, data associating program files with modules and data representing scheduling of modules in the interactive component;

a flow builder for selectively inserting files from the source of files into the interactive component in response to data from the flow data source, said flow builder including;

a parser for parsing the flow data into data representing the application program, data specifying modules and their characteristics, data associating program files with modules, and data representing scheduling of modules in the interactive component;

a directory module constructor, responsive to the parsed data representing the application program and the parsed data specifying modules and their characteristics, for constructing a directory module file containing one record including application data and one record for each specified module including module representative data;

a module formatter, responsive to the parsed data associating program files with modules, for constructing a module file containing a record for each associated program file and module including the program file associated with the module; and a module scheduler, responsive to the parsed data representing scheduling of the modules, for generating a sequence in which each program file is to be transmitted and wherein ones of the program files occur in such sequence at a greater frequency than others of said program files.

* * * * *